United States Patent [19]

Füchtey et al.

[11] Patent Number: 5,421,688
[45] Date of Patent: Jun. 6, 1995

[54] INSTALLATION FOR THE LOAD TRANSFER OF PIECE GOODS IN THE FORM OF LOAD UNITS SUCH AS CONTAINERS, RETURNABLE CONTAINERS, SEMI-TRAILERS OR THE LIKE

[75] Inventors: Heinz Füchtey; Burkhard Mende, both of Essen; Theo Schmitz, Duisburg, all of Germany

[73] Assignee: Krupp Industrietechnik Gesellschaft mit Beschrankter Haftung, Duisburg, Germany

[21] Appl. No.: 316,824

[22] Filed: Sep. 30, 1994

Related U.S. Application Data

[63] Continuation of Ser. No. 980,781, Feb. 9, 1993, abandoned.

[30] Foreign Application Priority Data

Jun. 25, 1991 [DE] Germany ............. 41 20 922.2

[51] Int. Cl.⁶ ................................. B65G 67/02
[52] U.S. Cl. ...................... 414/392; 414/399; 414/561; 414/344; 212/224
[58] Field of Search .......... 414/398, 399, 390, 391, 414/392, 393, 373, 560, 561, 562, 340, 344, 349, 351, 352, 339, 334, 786; 212/223, 224, 230, 231, 242, 264, 265, 244

[56] References Cited

U.S. PATENT DOCUMENTS

| 1,529,078 | 3/1925 | Mooney | 414/399 |
|---|---|---|---|
| 1,766,619 | 6/1930 | Fitch | 414/399 X |
| 1,900,867 | 3/1933 | Olds | 414/561 X |
| 1,971,339 | 8/1934 | Fitch | 414/344 X |
| 3,812,987 | 5/1974 | Watatani | 414/561 |
| 4,077,245 | 3/1978 | Bauer et al. | 414/269 X |
| 4,139,107 | 2/1979 | Ninomiya et al. | 414/392 |

FOREIGN PATENT DOCUMENTS

| 980727 | 12/1975 | Canada | 414/392 |
|---|---|---|---|
| 1556043 | 9/1969 | Germany . | |
| 1531050 | 9/1970 | Germany . | |
| 1556636 | 10/1970 | Germany . | |
| 1943875 | 3/1971 | Germany . | |
| 2440682 | 3/1976 | Germany . | |
| 2537944 | 3/1976 | Germany . | |
| 2555316 | 6/1976 | Germany . | |
| 2263767 | 7/1976 | Germany . | |
| 2534377 | 2/1977 | Germany . | |
| 3542190 | 6/1987 | Germany | 414/344 |
| 3833083 | 4/1990 | Germany . | |
| 3348361 | 4/1991 | Germany . | |
| 424632 | 5/1967 | Switzerland | 414/392 |
| 213807 | 4/1924 | United Kingdom | 414/392 |
| 266792 | 2/1927 | United Kingdom | 414/391 |
| 824285 | 11/1959 | United Kingdom | 414/344 |

OTHER PUBLICATIONS

Entwicklungstendenzen bei Geraten fur den Contianer–umschlag. In: dhf Sonderheft 1970, pp. 197–201.
Stienen, K. H. Vollautomatisches Lagern und Parken. In: deutsch hebe– und fordertechnik, H.6, 1966, pp. 420–424.
Wirtschaftlicher Container–Umschlag Mit Stationärem Gelenkkran published in F+H Fordern und Heben, 40 (1990) Aug. No. 8, Mainz.

*Primary Examiner*—Frank E. Werner
*Attorney, Agent, or Firm*—Herbert Dubno

[57] ABSTRACT

Apparatus for the installation for transferring piece goods between road and railborne vehicles includes a receiving and an issuing store, the outer sides of which remote from the railway line adjoin a loading roadway for the unloading or/and loading of road vehicles, each of the stores is provided with a plurality of loading lifting gears adapted to travel longitudinally for transporting load units beyond the railway lines between the roadway and at least the store, a plurality of train transfer lifting devices are provided to travel longitudinally, their operating radii extending laterally beyond the railway line in the direction towards the stores, and additional transport devices are provided which bridge the mutually separated ranges of the lifting gears and the train transfer lifting devices for transporting load units transversely to the railway line.

6 Claims, 8 Drawing Sheets

INSTALLATION FOR THE LOAD TRANSFER OF PIECE GOODS IN THE FORM OF LOAD UNITS SUCH AS CONTAINERS, RETURNABLE CONTAINERS, SEMI-TRAILERS OR THE LIKE

This is a continuation of application Ser. No. 07/980,781 filed on 9 Feb. 1993, now abandoned.

CROSS REFERENCE TO RELATED APPLICATIONS

This is a national phase application corresponding to PCT/EP92/01338 filed 13 Jun. 1992 and based, in turn, upon an application filed in Germany as P 41 20 922.2 on 25 Jun. 1991 under the International Convention.

FIELD OF THE INVENTION

This invention relates to an installation for the load transfer of piece goods in the form of load units such as containers, returnable containers, semi-trailers or the like between road and rail-borne vehicles using lifting equipment adapted to travel in the longitudinal direction of a railway track, comprising at least one store set up between a single or multiple track railway line and a single or multiple lane roadway.

OBJECTS OF THE INVENTION

The object of the invention is to provide a means by which the load transfer of load units between loading and unloading units can be simplified and the load transfer time can be shortened.

A further object is to provide the load transfer installation in such a manner that it use components which meet, different requirements, for increasing load transfer numbers.

SUMMARY OF THE INVENTION

The basic concept of the invention in this context resides in that on different sides of the railway line a receiving and an issuing store are provided, followed towards the outside by the associated unloading and loading roadways.

The receiving and the issuing store as well as the railway track are each associated with a plurality of longitudinally movable unloading or loading transfer lifting means, the operating ranges of which—viewed transversely to the direction of travel—are separate but adjoin each other. For conveying the loading units between the operating ranges of the unloading respectively loading and the train transfer lifting equipment additional transport means are provided laterally adjoining the railway track, which at least perform or permit the required transport movement transversely to the railway track. By the use of mutually separate stores with an associated roadway the load transfer can be simplified and accelerated as the road vehicle need not reach the load transfer region simultaneously with the train. in this context the receiving and the issuing stores serve as buffers by means of which in addition to a desired transport sequence during the transfer onto the train or onto road transport can be brought bout. Because the operating ranges of the respective lifting equipment serving the respective roadway and the railway line are separate from one another these may be employed independently from one another for load transfer depending on the requirements in the particular associated operating region.

Having regard to an influx at outflow of loading units with as little interference as possible, the roadway normally comprises at least two unloading loading roadways, the innermost roadway (i.e. adjoining the receiving or the issuing store) serving as a parking lane.

The processing of trains can be simplified and accelerated by the number of train load transfer lifting gear means which is greater than that of the unloading or loading lifting gear means.

The additional transport means may be of optional type as long as they are at least suitable to convey the loading units between the mutually separated operating regions of the unloading, loading and train transfer lifting means. In a preferred embodiment of the invention the additional transport means are designed as pallet conveyors circulating at two levels and operating in the manner of a horizontally oriented continuous belt conveyor and which—at least within the range of the input and the output store—extend laterally into the operating range of the unloading or loading lifting gear and the train transfer lifting gear means and the width of which in the longitudinal direction of the store is adapted to the length of the largest possible loading unit.

Preferably the pallet conveyor belts extend on both sides in the direction of the railroad line and the adjoining unloading or loading roadway beyond the receiving and the issuing store. This feature offers the advantage that the associated lifting gear means when transferring need traverse only short transverse routes; at least a substantial portion of the required transverse transport and the predesigned keeping ready (sorting with direct access) of the load units is brought about by the pallet conveyor belts of which, if the need arises, several at a time may be placed next to one another in the longitudinal direction of the railroad line. The feature in analogy with a continuous belt conveyor, besides an enlargement of the utilizable storage space, has such the consequence, as the pallets always remain part of the additional transport means and accordingly the additional transport of empty pallets is dispensed with.

The load transfer capacity and operational safety may be further improved in that the lifting gear means are each composed of an overhead crane including a telescopic jib carrying a spreader, the spreader being pivotal in respect of the telescope jib and the latter in turn being pivotal in relation to the crane girder and biting pivotal in staggered relationship thereto. Due to the conventionally present hoisting ropes having been dispensed with, undesirable swinging movements of the load units are substantially avoided and more rapid positioning procedures are possible. By operating the telescope jib it is possible to carry out transport movements even without displacing the crane girder.

The load transfer capacity and operational safety may be further improved-in that the lifting gear means are each composed of an overhead crane including a telescopic jib carrying a spreader, the spreader being pivotal in respect of the telescope jib and the latter in turn being pivotal in relation to the crane girder and being pivotal in staggered relationship thereto. Due to the conventionally present hoisting ropes having been dispensed with, undesirable swinging movements of the load units are substantially avoided and more rapid positioning procedures are possible. By operating the telescope jib it is possible to carry out transport movements even without displacing the crane girder.

The use of a movable overhead crane movable on an elevated train track brings about the dispensing with the gantry supports which are normally necessary and thus at the same time brings about a reduction of the mass which needs to be accelerated during travelling.

Preferably the adjoining telescope jibs which succeed each other in the travelling direction (i.e. those of the unloading or loading or train load transfer lifting gear means) are mutually staggered transversely to the direction of travel so that their pivoting axes adopt a different position in relation to the respective overhead crane. This design—in which the pivoting axes of adjoining telescope jibs are not aligned one behind the other in the travelling direction —facilitates the interaction of adjoining lifting gear means of the same type, for example in the joint handling (in particular turning around) of large load units.

The load transfer installation, from a point of view of economics, can be operated particularly advantageously if for each of the two pallet conveyor belts of the receiving or the issuing store one train trans-loading lifting means is provided. The advantage thereby attained resides in that a pallet conveyor belt can make available one suitable storage place whereas the train trans-loading lifting gear services the other pallet belt.

The aforedescribed load transfer installation can more particularly be so designed that it comprises a dual track railway line.

Departing from the previously described embodiments the subject of the invention may also be realized such that at least one additional transportation means is provided between the receiving or the issuing store and the railway line, i.e. separate from the receiving and issuing store on both sides of the railway line. In this context the additional transport means is constructed as a horizontal continuous belt conveyor comprising transport surfaces for load units circulating in a plane, the receiver surfaces in the redirecting section performing a movement in the direction towards the railway line or away from there and wherein the longitudinal axis of each additional transport means is orientated parallel to the railway line or receiving respectively issuing store. The advantage of this design also resides in that the transport surfaces which in the normal situation are horizontally disposed may, outside of the re-directioning sections (in the commencement and terminal regions of the continuous belt conveyor) become effective as a distributor by means of which loading units may be assembled in a desired sequence with a view to the railway line or for example the issuing store. Because the transport surfaces in any event also perform a transverse movement, it is possible for the receiving and the issuing store optionally to be of particularly simple construction, i.e. for example in the form of passive stores.

Each re-directing section is for example so designed that in that region three transport surfaces at a time-viewed transversely to the longitudinal direction of the railway line may be placed directly next to one another; however, in that position only two transport surfaces are available at any one time as well as the empty position, the size of which corresponds to that of a transport surface. The result thereof is that the mutual spacing of the innermost (adjoining the railway line) and outermost transport surfaces outside of the redirecting sections correspond at least in width to one transport surface.

In accordance with the purpose of use each transport surface corresponds in size to the largest possible load unit, i.e. the space requirements on the respective transport surface.

Having regard to the employment of the continuous belt conveyor transport surfaces the receiving and the issuing store may each be designed as single storage stores, the storage area of which in the longitudinal and transverse direction is sub-divided according to the space requirements or half of the space requirement for the largest possible load unit. This sub-division of the storage area simplifies the collating of the load units and their load transfer in a desired sequence.

The sub-division of the surface units into two surface halves is advantageous in order to be able in particular to perform a substantially automatized load transfer also with relatively small load units. In the simplest case the surface unit of the single storey store may be fixed by suitable markings (for example of a mechanical or optical nature).

The unloading, loading and train transfer lifting gear means may be of optional design provided they have an adequate operating radius in relation to the circulating transport area. With a view to economics at least the unloading and loading lifting gear means are designed as overhead cranes comprising crane trolleys and spreaders, the operating radius of which laterally at least embraces the outermost transport surface of the at least one associated additional transport means. In that context the crane trolleys must be able to perform a transverse movement by way of which the loading units can be conveyed to or removed from the region of the outermost transport surfaces.

The train transfer lifting gear means may be provided with telescope jibs in the manner already described above. Preferably the train transfer lifting means likewise take the form of overhead cranes each comprising two crane trolleys and spreader and the operating radius laterally embraces at least the innermost transport surfaces of the additional transport means. In this context one crane trolley is intended for loading the train and the other crane trolley for unloading it. The control and operation of the overhead crane may in appropriate circumstances be optimized in that it is coupled control technologically to the adjoining additional transport means. In this manner it impossible to ensure that the load unit to be taken over or passed on already adopts a favorable predetermined position in relation to the overhead crane on one of the transport surfaces.

The crane trolleys are preferably provided so closely above the railway line that only short lift movements involving small free rope lengths need to be performed.

The embodiment here discussed may also be equipped with a single track rail line. The unloading or loading roadway associated with the receiving and the issuing store, in order to avoid disruptions and delays should be so designed that at least two lanes adjoin each other of which the innermost lane serves as a parking lane for unloading or loading of road vehicles. If the load transfer installation comprises three lane roadways it is possible also for the two innermost lanes to be used as parking lanes.

One of the important advantages of the invention resides in that the load transfer installation is of modular design and can be adapted to varying requirements, in particular increasing transfer frequencies accordingly. In this context one module comprises besides the two passive stores including two horizontally circulating continuous belt carrier surfaces, respectively two dual level circulating pallet belts (without passive store), the railway line and the roadways on both sides, the necessary unloading, loading and train transfer lifting gear means.

A specialty of the load transfer installation resides in that the train during processing (loading and/or unloading) need not necessarily be stopped, but can be moved at a predetermined velocity adapted to the processing needs through the load transfer installation; by this operating mode time consuming transport movements in the longitudinal direction of the rail line can be avoided since the associated goods carriages must pass each section of the receiving or the issuing store. In this context the construction and the operational safety of the load transfer installation may be improved in that the train to be processes is moved at lest in the region of the load transfer installation by means of a suitable drive unit (traction and/or push unit) so that for example the provision of an overhead electrical line can be dispensed with.

BRIEF DESCRIPTION OF THE DRAWING

The above and other objects, features, and advantages will become more readily apparent-from the following description, reference being made to the accompanying drawing in which:

FIG. 3a and FIG. 3b are partial cross-sections through the load transfer installation in the region of the railway line respectively the unloading roadway on a scale which is larger than that in FIG. 2;

SPECIFIC DESCRIPTION

Figure 1:
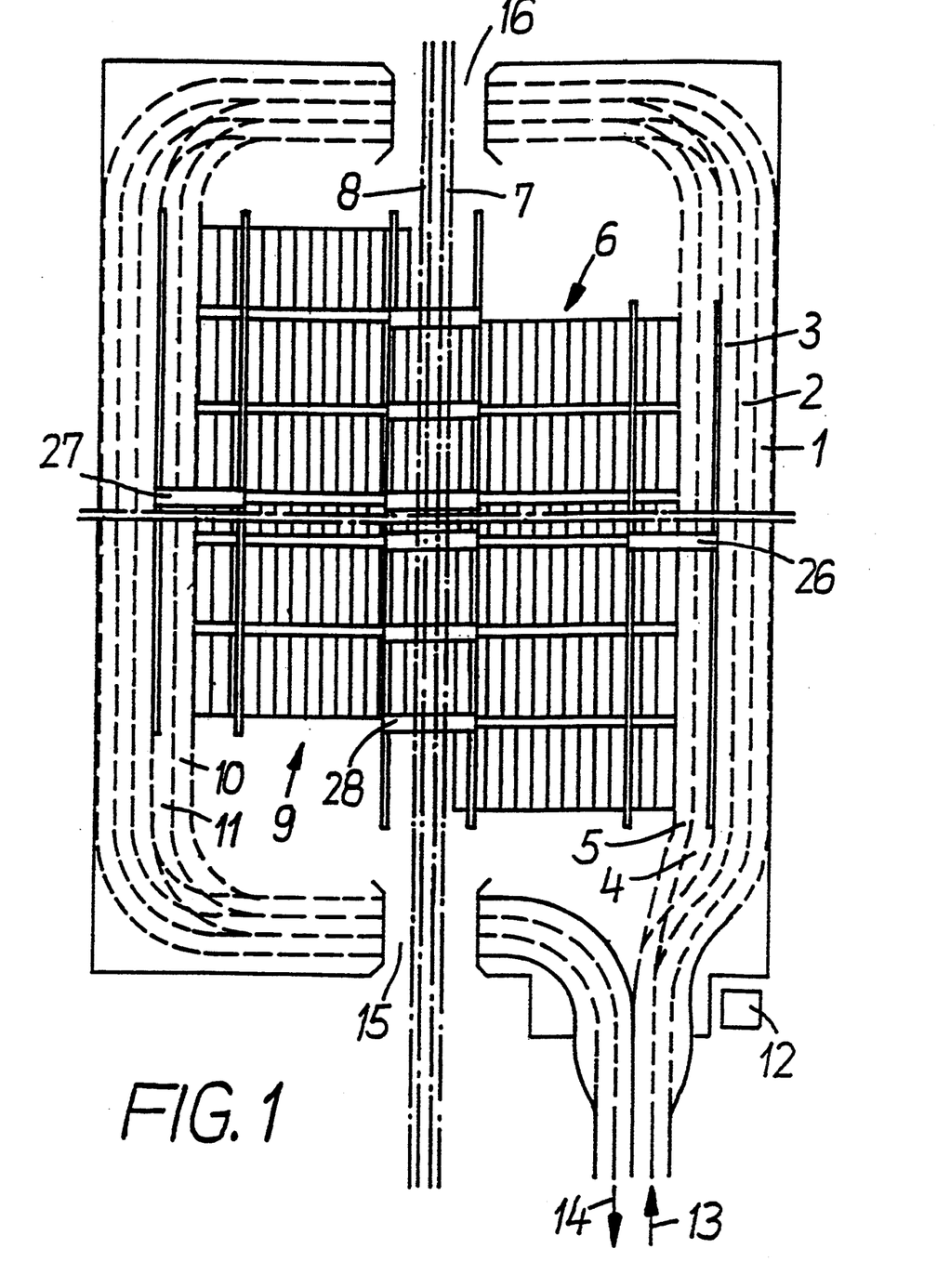
FIG. 1 is a diagrammatic plan view without roof of a load transfer installation including a dual track railway line as well as a receiving and an issuing store each comprising a plurality of additional transport means in the form of transversely oriented pallet belts.
Figure 2:
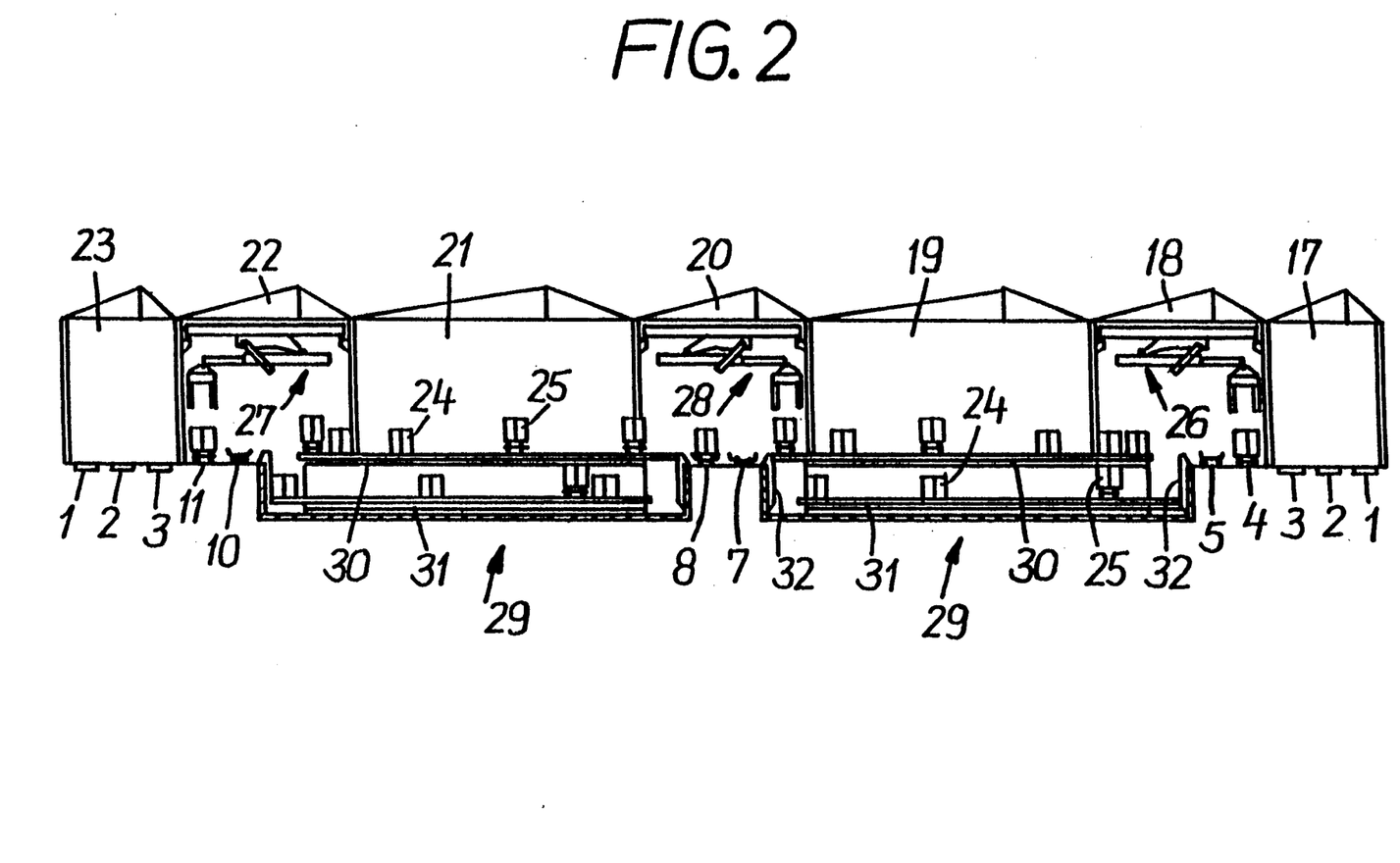
FIG. 2 is a cross-section through the load transfer installation on a scale enlarged in relation to FIG. 1.

The load transfer installation illustrated in FIG. 1 shows—viewed from the right-hand side towards the left (see also FIG. 2)—the following components and equipment: an outwardly situated feed and distributor roadway including three delivery lanes 1 to 3, one unloading roadway including two adjoining unloading lanes 4 and 5, a laterally adjoining receiving store 6 a railway line including two adjoining tracks 7 and 8, a laterally adjoining issuing store 9, a loading roadway including two mutually adjoining loading lanes 10 and 11 and—laterally adjoining—the previously mentioned outermost delivery lanes 1 to 3.

The road vehicles to be unloaded or loaded (for example road trucks, semi-trailer and tractor units) enter the region of the load transfer installation (arrow 13) in the region of a reception area 12 and again leave the installation (arrow 14).

After passing the reception area 12 the road vehicles may proceed either directly by way of the unloading lanes 4, 5 towards the region of the receiving store 6 or first on the delivery lanes 1 to 3, after by-passing the receiving store, proceed to the region of the issuing store 9 by way of the loading lanes 10 and 11. The unloaded or loaded road vehicles may change over again to the delivery lanes i to 3 for travelling around the issuing store 9 or may enter these directly after leaving the issuing store 9. The roadways form a crossing-free one-way traffic ring without opposing traffic. This is also made possible by the feature that the railroad line with the tracks 7 and 8 crosses the delivery lanes 1 to 3 by way of bridges 15 and 16.

The transfer of the load units to be handled—which may for example comprise containers 24 and semi-trailers 25 (see FIG. 2)—between the unloading lanes 4, 5 and the receiving store 6, proceeds by means of two unloading lifting gear means 26 or two loading lifting gear means 27 or a greater number of train transfer lifting gear means 28; the latter are supported in a longitudinally movable manner in the central roofed section 20 above the tracks 7 and 8. Understandably the loading/unloading operations between the rail tracks 7, 8 and the store 9 or between the two stores and lanes 10 and 11 utilize the same means.

In the working example under discussion the lifting gear means 26 to 28 are so designed that their operating radii extend merely over a small portion of the width of the receiving store 6 or issuing store 9 so that they will not overlap. Part of the transverse movement for bridging the distance between the operating radii of the lifting means 26 and 28 or 28 and 27 will accordingly be taken care of by an additional transport means which serves to feed the load units 24, 25 to be handled to the operating range of the train transfer lifting gear 28 or the loading lifting gear 27.

Figure 3A:
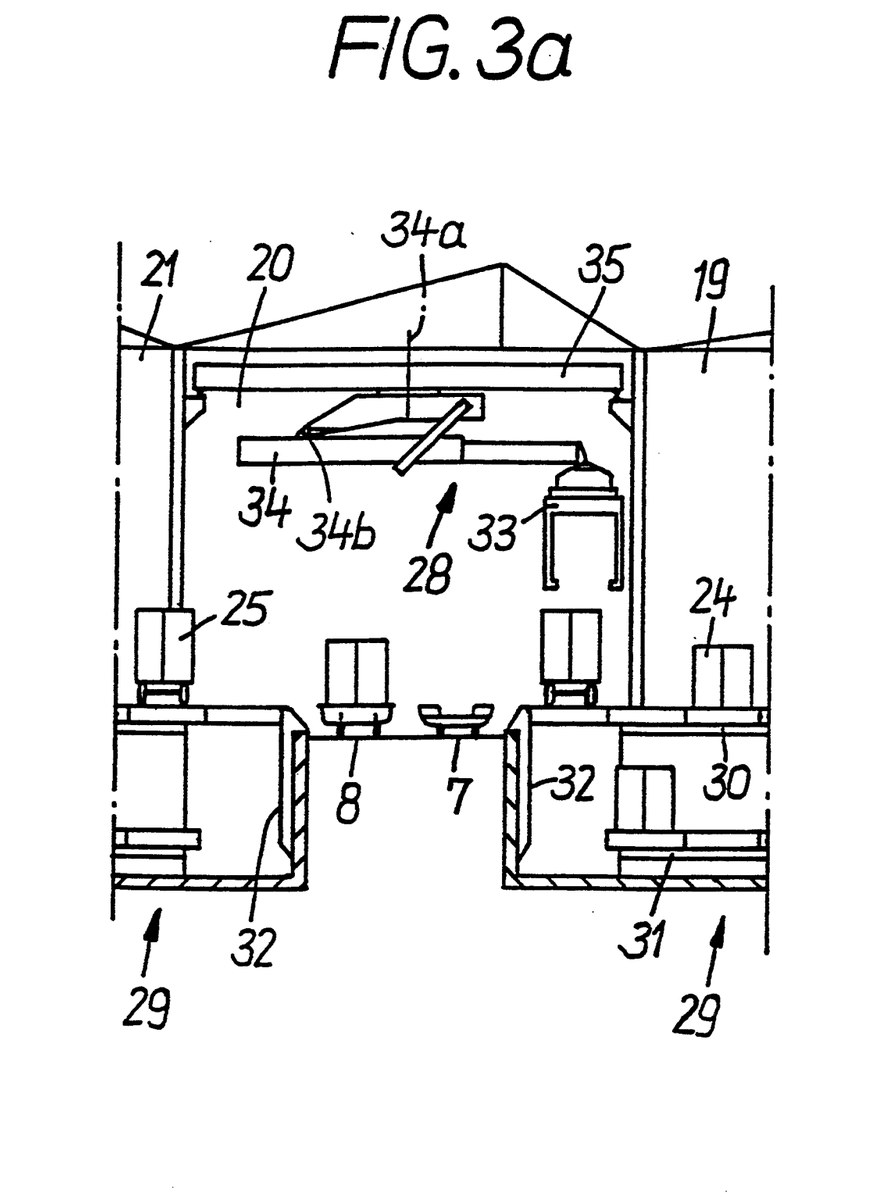

In the working example under discussion (see in particular FIGS. 2, 3a, b) the additional transport means—also with a view to improved storage capacity—are designed as dual storey circulating pallet belts 29 which operating in the manner of a horizontally orientated continuous belt conveyor. The pallet belts are composed of pallets 29a, which are slidable along an upper guide 30 or along a lower guide track 31 and which outside the roofed section 19 and 21 adjoining the inner lane 5 or and adjoining the rail tracks 7, 8 perform a direction changing movement; in the course thereof one pallet 29a at a time is lowered to the level of the lower guide track 31 or raised to the upper guide track 30. The support of the pallets 29a in the direction changing region proceeds by way of lateral guides 32 (see FIG. 3a) respectively by way of not illustrated guide belts running parallel to the plane of the drawing.

Depending on the circulating direction of the pallet belt 29 the associated load units 24, 25 perform cyclically a transverse move and enter for example from the region of the roofed section 18 into a region adjoining the track 7 or from the region of the roofed section 20 into a region adjoining the inner loading lane 10 (in the roofed section 22). As may be seen from FIG. 2 the length of the pallet belts 29 transversely to the tracks 7, 8 is greater than the width of the associated roofed section 9 or 21 for the receiving store 6 and respectively to the issuing store 9. The width of the pallet belts in the longitudinal direction of the tracks 7, 8 is adapted to the length of the largest possible load unit.

The unloading, loading and train transfer lifting means 26 to 28 (see also FIGS. 3a, 3b) each comprise an overhead crane including a telescope jib 34 carrying a spreader 33. The jib in turn is supported from a crane girder 35 in a manner allowing it to travel longitudinally i.e. normal to the plane of the drawing.

The telescope jib can perform rotary and pivoting movements about the axes 34a and 35b in relation to the crane girder 35; analogous conditions apply to the spreader 33 in relation to the telescope jib 34. Whereas the lifting gear means 26 and 27 serve for handling load units within the roofed section 18 or 22 between the unloading or loading lanes 4, 5 or 10, 11 and the adjoining pallet belt 29, the train transfer lifting means 28, accommodated in the roofed section 20, are employed for loading or unloading trains 36 and 37.

The manner of employment of the aforedescribed lifting gear means (with telescope jibs 34) may optionally be further improved in that lifting means adjoining each other in the direction of travel (i.e. the unloading, loading or the train transfer lifting means) comprise telescope jibs 34 which are mutually staggered in a direction transverse to the traveling direction; their pivoting axes 34a accordingly adopt a different position in relation to the crane girder 35, i.e.—viewed in the direction of travel—they are not positioned in one line behind one another.

For explaining the aforedescribed situation reference is made for example to the illustration according to FIG. 3a. Departing therefrom the pivoting axes 34a of telescope jibs 34 adjoining each other in the direction of travel are not provided in the middle of the respectively associated crane girder 35, but are alternatingly displaced either in the direction of the roofed section 19 or the roofed section.21. This mutually staggered arrangement of the telescope jibs 34 permits respectively facilitates the interaction in the joint handling of relatively large load units.

In the embodiment illustrated in FIG. 1 the number of train transfer lifting means 28 is so large that one train transfer lifting gear means 28 in each case services two pallet belts 29. Generally speaking the number of train transfer lifting means 28 should be greater than that of the unloading and loading means 26 and 27.

Figure 4:
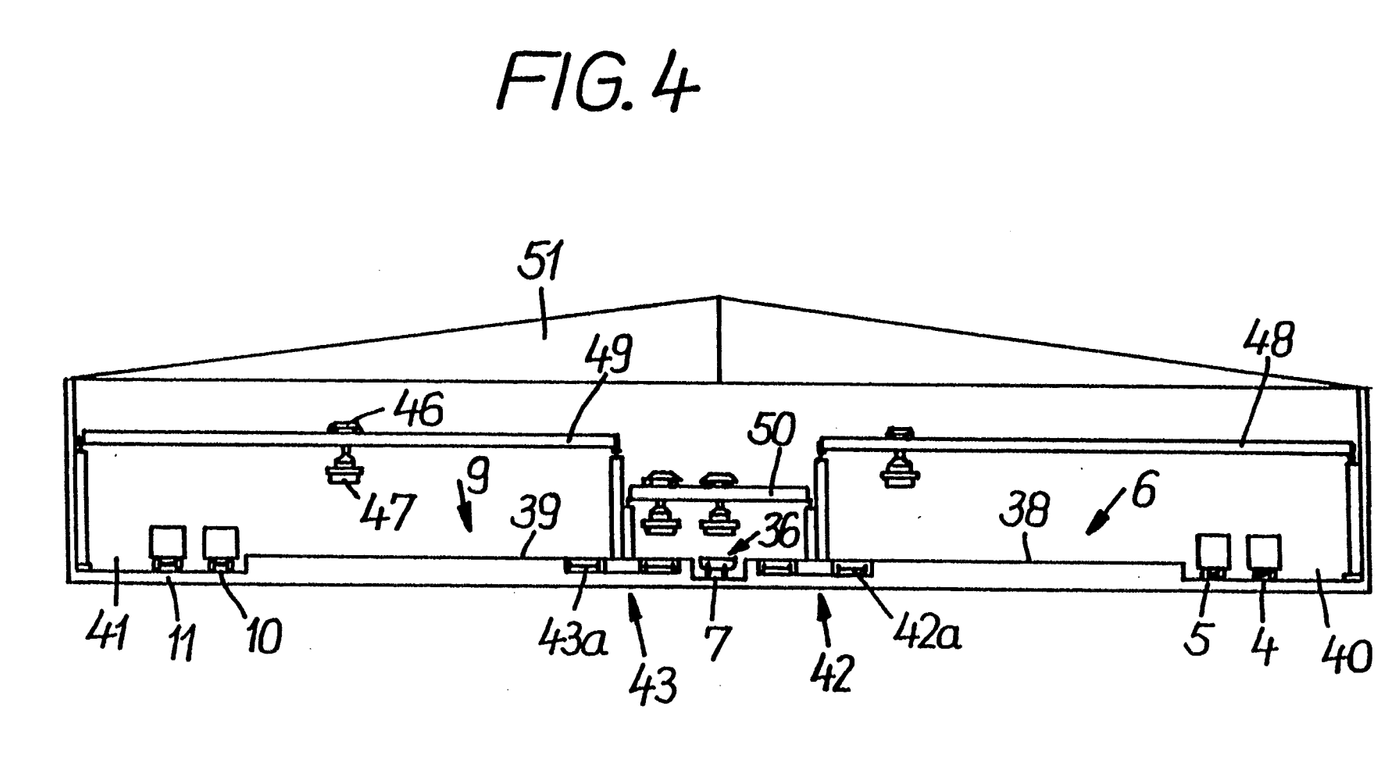
FIG. 4 is a diagrammatic cross-section through an embodiment of a load transfer installation including a single track railway line, a receiving and an issuing store designed as a single storey store as well as distributor means in the form of continuous belt transport surfaces, laterally adjoining the railway line.

In the embodiment according to FIG. 4 the receiving and -the issuing store are each designed as combined single storey stores having stationary store areas 38 respectively 39, which are adjoined laterally by three unloading or loading lanes 5, 4, 40, and 10, 11, 41 and by additional transport means serving as distributor means 42, 43. Each store surface (for example the store surface 39 of the issuing store 9 illustrated in FIG. 5) is subdivided in the longitudinal and transverse directions into surface units 39a or 39b, the size of which corresponds to the space requirement for the greatest possible load unit or one half of such space requirement (of the surface units 39b).

Between the mutually opposite distributor means 42 and 43 a rail track 7 for a train 36 to be unloaded or loaded is disposed.

Each distributor means 42 respectively 43 is designed in the manner of a horizontally disposed continuous belt conveyor comprising transport surfaces 42a respectively 43a for load units circulating in one plane.

The transport surfaces move—depending on the selected circulating direction—essentially parallel to the track 7 (of the double arrows 44) and merely in the region of directional change, (i.e. in the beginning and end regions of the distributor) perform a transverse movement (of the double arrows 45) in the direction towards or away from the track 7.

In this context each distributor is so designed that in the directional change region at any stage three transport surfaces 42a respectively 43a adjoin each other; accordingly the mutual distance between the outermost and the innermost transport surfaces outside the directional change region corresponds at least to the width of a transport surface; the latter is moreover sizewise adapted to the largest possible load unit.

Figure 5:
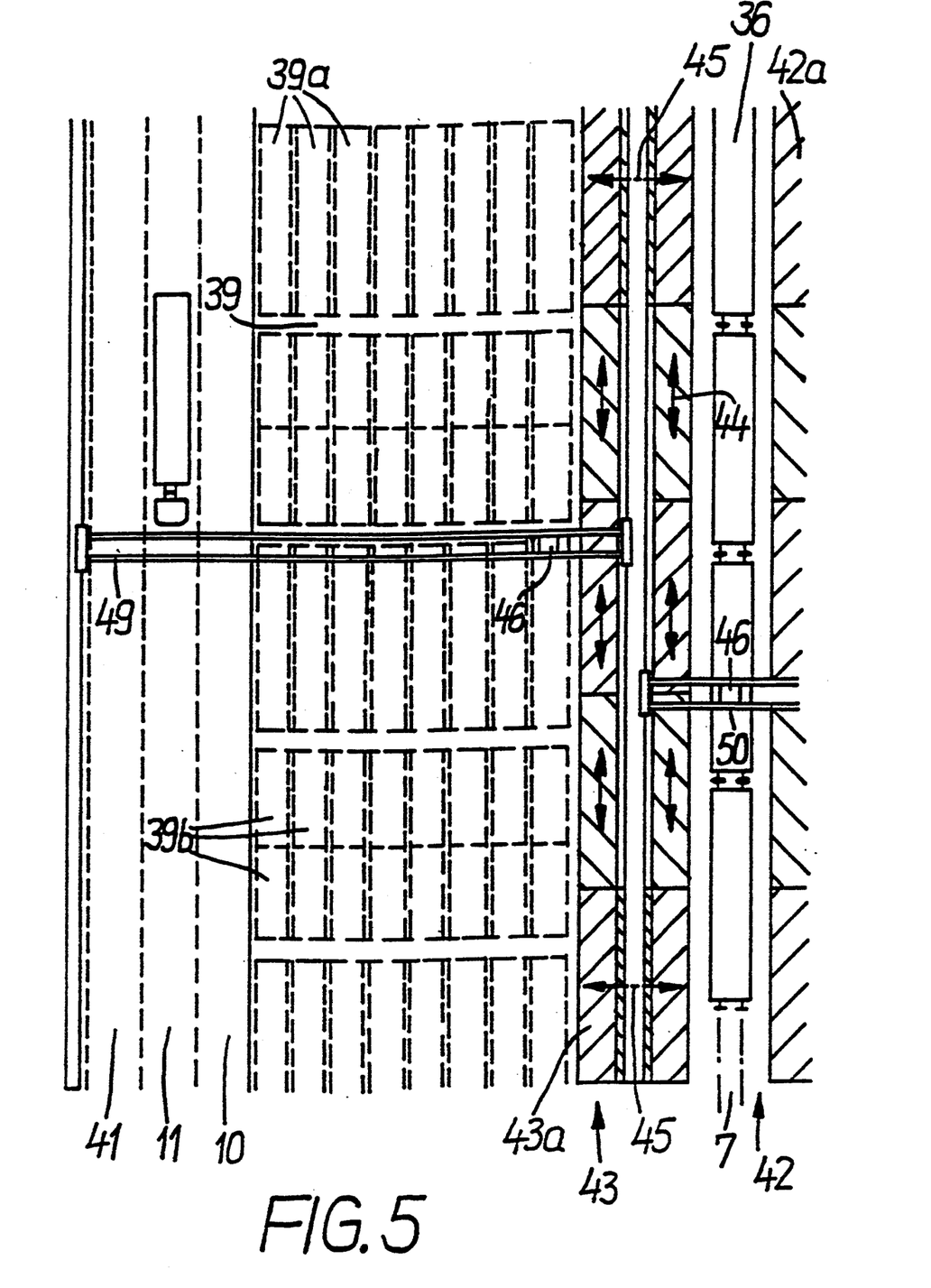
FIG. 5 is a diagrammatic partial plan view without roof of the left-hand half of the load transfer installation according to FIG. 4.

The unloading, loading and train transfer lifting means 26 to 28 each take the form of overhead cranes comprising train trolleys 46 and spreaders 47 which can travel to and fro on train girders 48, 49 or 50 parallel to the track 7.

As will be seen in FIGS. 4 and 5 the crane girders 48 and 49 are so dimensioned that the operating radius of these lifting means embraces the outermost transport surfaces 48a respectively 43a of the distributors 42, 43. The operating radius of the train transfer lifting means 28 as dictated by the crane girders 50 extends laterally beyond the innermost transport surfaces 43a respectively 42a. The construction and mutual inter-relationship of the lifting gear means 26 to 28 and distributors 42, 43 ensures that the load units to be handled can be transferred from the operating range of the unloading lifting means to that of the train transfer lifting means or from the operating range of the latter into that of the loading lifting means.

In accordance with the length of the lead transfer installation (and according to the embodiment of FIG. 1) a plurality of distributors 42 or 43 may each be fitted in modular manner in succession in the longitudinal direction of the track 7.

Figure 6A:
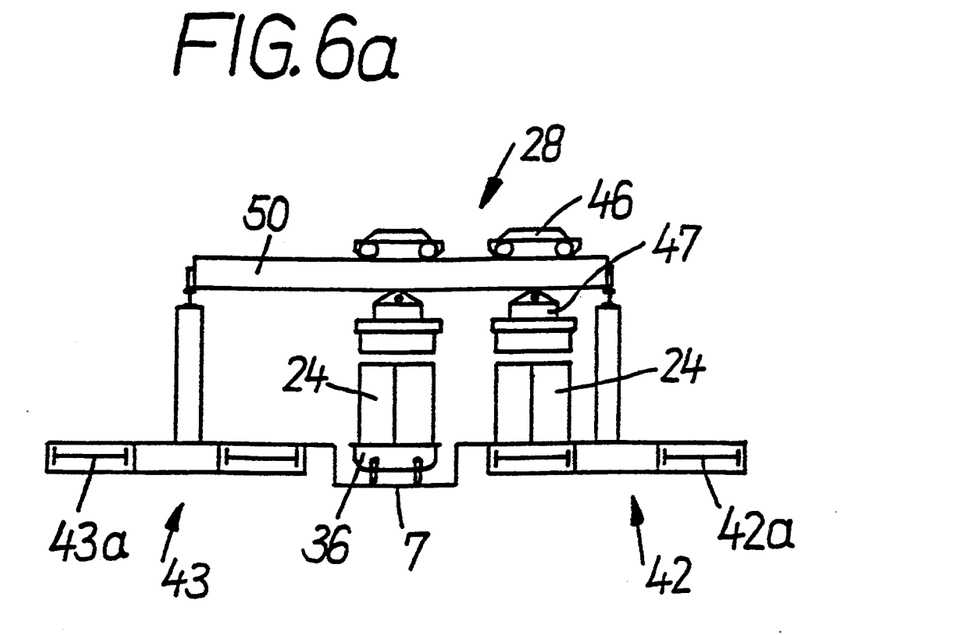
FIG. 6a to 6d are various operating stages in diagrammatic form during the transfer of load units in the region of the railway line.
Figure 6B:
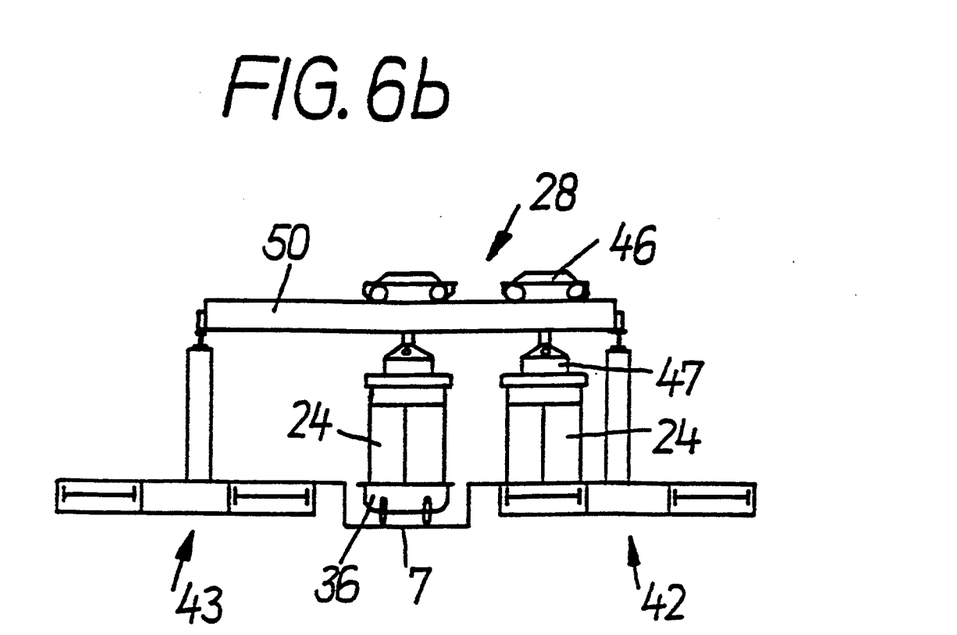
Figure 6C:
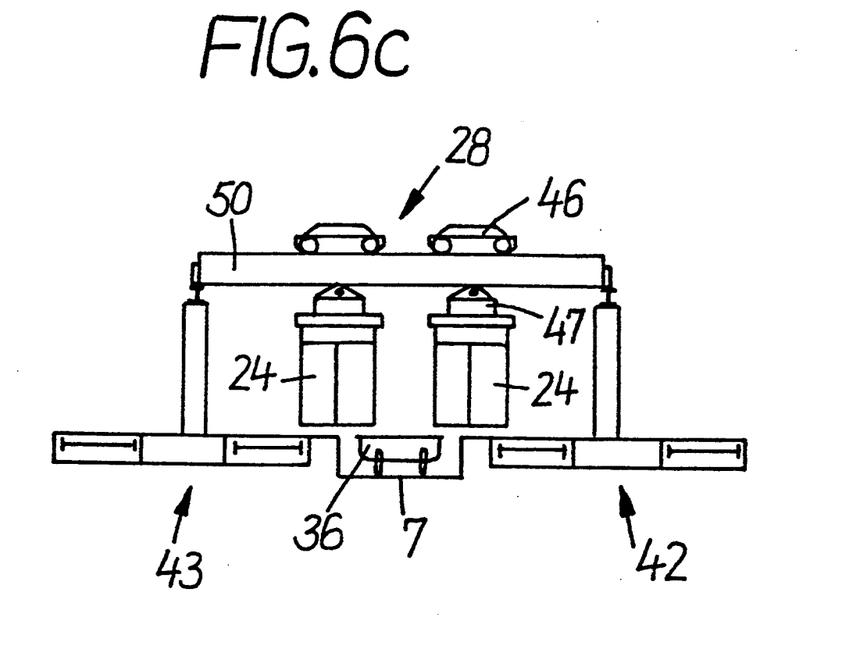
Figure 6D:
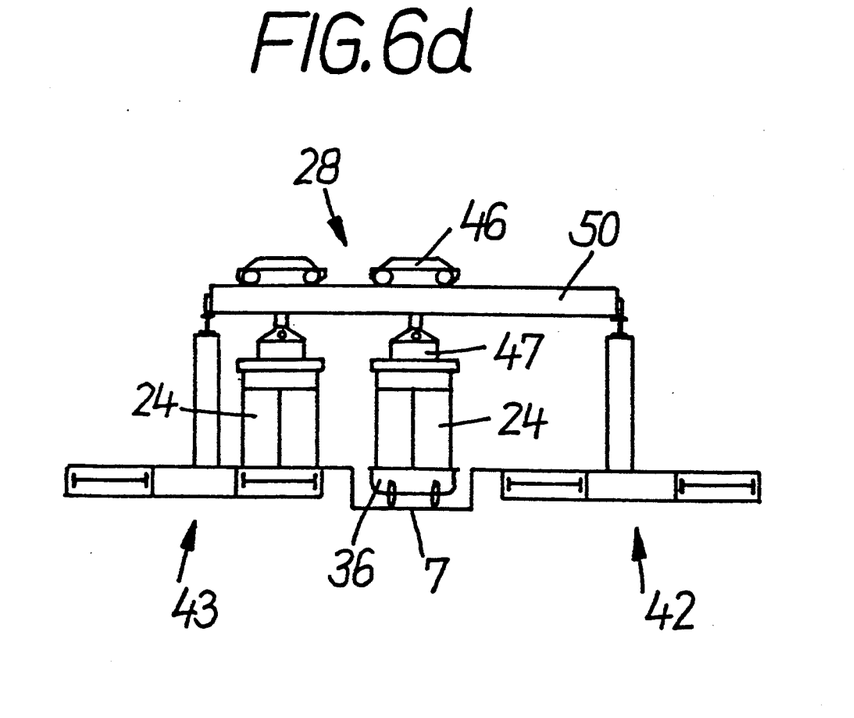

The train transfer lifting apparatus 28 equipped with two crane trolleys 46 and spreaders 47 can be operated as follows:

In the starting position (FIG. 6a) a train 36 has entered the load transfer installation and has stopped. The distributor 42 in the meantime adapts itself to the carriage sequence of the train; the lifting apparatus 28 enters into a first transfer position, the spreaders 47 are lowered and engage the load units 24 to be handled (FIG. 6b). These are subsequently lifted and conveyed to a new transfer position (FIG. 6c); there they are once again lowered (FIG. 6d) and subsequently released from the spreaders 47 before the train transfer lifting means 28 is moved onward.

Figure 7:
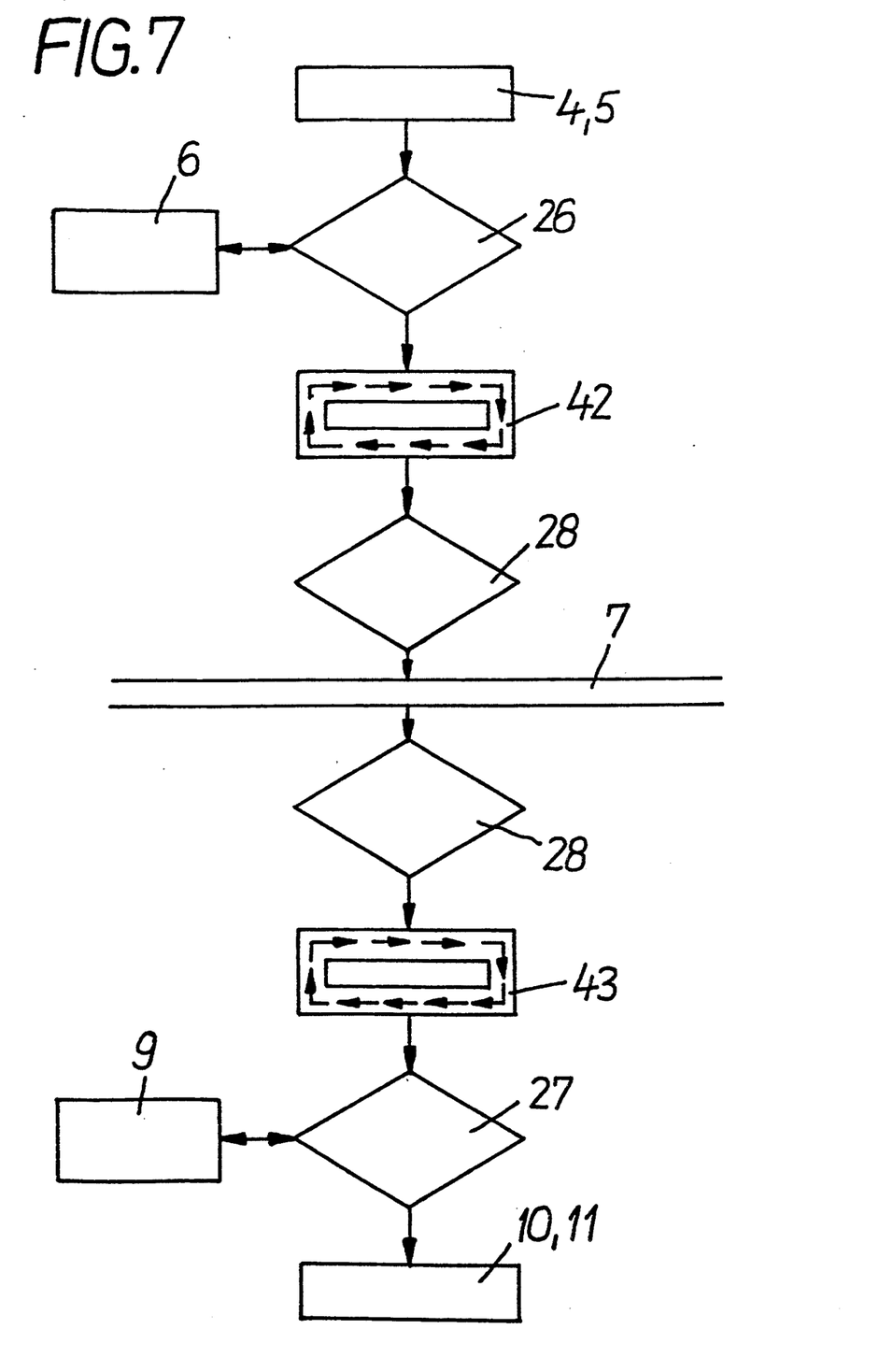
FIG. 7 is a diagrammatic representation in the form of a flow diagram of the various operations taking place in a load transfer installation according to FIG. 4.

The functions and transfer procedures of the embodiment in accordance with FIGS. 4 to 6 can be derived from the flow diagram illustrated in FIG. 7.

The load units to be handled are advanced from the region of the unloading lanes 4, 5 by means of the unloading lifting gear 26 to the receiving store 6 respectively a distributor 42 and can be transported by employment of the train transfer lifting gear 28 into the region of the track 7. When unloading a train the reverse sequence applies. By means of the train transfer lifting gear 28 the load units are transferred from the region of the track 7 into the region of the distributor 43 and can from there be forwarded with the aid of the loading lifting means either first to be deposited in the issuing store 9 or directly to be transferred to the region of the loading lanes 10, 11.

In the embodiment according to FIG. 4 a roof cover 51 extends laterally into the region adjoining the outermost lanes 40 respectively 41.

We claim:

1. An installation for transfer of load units, comprising:
    a longitudinal railway track for a railborne vehicle;
    means forming a receiving store along one side of said railway track and exclusively receiving road-borne load units;
    an unloading roadway along a side of said receiving store opposite said railway track and parallel thereto exclusively for road vehicles delivering said road-borne load units to said receiving store;
    means forming an issuing store along an opposite side of said railway track for exclusively delivering to the road vehicles load units in said issuing store;
    a loading roadway along a side of said issuing store opposite said railway track and parallel thereto exclusively for the road vehicles receiving the load units from said issuing store;
    at least one receiving lifting device having an operating range between said unloading roadway and said receiving store and movable between said unloading roadway and said receiving store for transporting road-borne load units from the road vehicles on said unloading roadway to said receiving store;
    at least one delivery lifting device having an operating range between said loading roadway and said issuing store and movable between said issuing store and the road vehicles on said loading roadway for transporting the load units from said issuing store to said road vehicles on said loading roadway;
    a plurality of further lifting devices spaced along said railway track and having operating ranges spanning across said railway track without overlapping the operating ranges of said receiving and delivery lifting devices for transferring load units to and from said railborne vehicle; and
    additional transport means laterally adjoining said railway track on opposite sides thereof and respectively bridging the operating ranges of said receiving lifting device and said further lifting devices and the operating ranges of said further lifting devices and said delivery lifting device for transferring said load units transversely to said railway track.

2. The installation defined in claim 1 wherein said railway track has two pairs of rails and each of said roadways has a plurality of lanes, said roadways being connected at at least one end of said installation by curved stretches and a bridge is provided to enable said track to cross said roadways.

3. The installation defined in claim 1 wherein said additional transport means includes at least one endless dual level pallet shifting belt extending laterally from said railway track toward a respective one of said stores and of a width adapted to receive a length of a largest load unit transferred in the installation.

4. The installation defined in claim 1 wherein each of said lifting devices is a crank which includes a crank girder extending transversely to said railway track, a telescope jib swingable about a vertical axis on the carrier, a spreader pivotally mounted on the jib and means on said spreader engageable with said load units.

5. The installation defined in claim 1 wherein a plurality of said cranes are mounted in succession along said track with respective vertical axes mutually staggered transversely to the track.

6. The installation defined in claim 1 wherein each of said stores has a plurality of horizontally arrayed storage areas for receiving said load units.

* * * * *